UNITED STATES PATENT OFFICE.

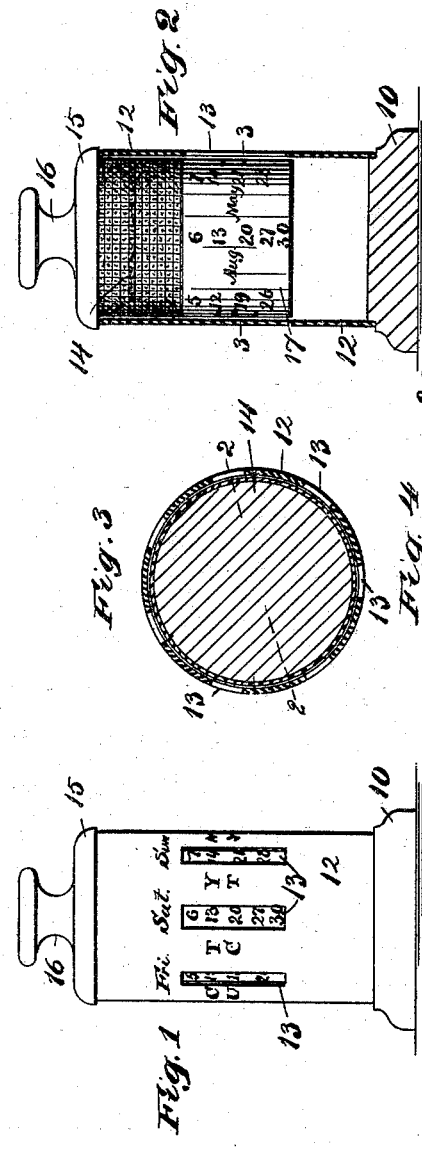

DANIEL A. HOLTZMAN, OF MYERSTOWN, PENNSYLVANIA.

PERPETUAL CALENDAR.

SPECIFICATION forming part of Letters Patent No. 505,313, dated September 19, 1893.

Application filed September 8 1892. Serial No. 445,308. (Model.)

*To all whom it may concern:*

Be it known that I, DANIEL A. HOLTZMAN, of Myerstown, in the county of Lebanon and State of Pennsylvania, have invented a new and Improved Perpetual Calendar, of which the following is a full, clear, and exact description.

My invention relates to improvements in calendars, and the object of my invention is to produce a simple calendar which is in effect a perpetual calendar, which may be very readily adjusted to suit the different years, months and days, and by means of which any particular day may be quickly and accurately ascertained.

To this end my invention consists in certain features of construction and combinations of parts, as will be hereinafter described and then pointed out in the claims.

Reference is to be had to the accompanying drawings forming a part of this specification, in which similar figures of reference indicate corresponding parts in all the views.

Figure 1 is a side elevation of the calendar embodying my invention. Fig. 2 is a vertical section of the same on the line 2—2 of Fig. 3. Fig. 3 is a sectional plan view on the line 3—3 in Fig. 2. Fig. 4 is a diagram of the date blank which is secured to the inner movable portion of the calendar; and Fig. 5 is a diagram of the shell or cylinder which incloses the date drum, showing the detailed arrangement of the cylinder, and the slots through which the dates are seen.

The calendar has a suitable base 10, to which is fastened the shell or cylinder 12. This shell or cylinder is open at the top and is provided with seven vertical equidistant slots 13, above which appear in regular order the names of the days of the week, as shown clearly in Fig. 5, and through these slots are seen the dates on the inner portion of the calendar, as described below. The blank spaces between the slots are marked with arbitrary characters, the letters of the word "Century" being employed in the present instance, although any seven-lettered word may be employed or other characters used. As shown, the letter "C" stands for Sunday, "E" for Monday, "N" for Tuesday, and so on. It will be observed that there are two rows of these letters, and in the lower row, "C" stands for Monday, "E" for Tuesday, and so on through the week. The upper letters are used for January and February, and for all common years, while the lower letters are used for leap years and for all the months except January and February. The operation and the manner of using these letters will be hereinafter described.

A drum 14 is held to turn in the cylinder 12, and this drum has at its upper end, a flange 15 which rests upon the cylinder, and a suitable handle 16 by which it may be turned. The handle, however, is unnecessary, and if desired, the drum may be made hollow and filled with shot so as to be used as a pane cleaner. The face of the drum is covered by a sheet or strip 17 of any suitable material on which are arranged numbers representing dates, and the date numbers are produced in groups, as shown in the diagram Fig. 4, each group representing a century.

As shown in the drawings, the calendar is arranged for the eighteenth, nineteenth, twentieth and twenty-first centuries, but it will be understood that a greater number of centuries may be represented if desired. The eighteenth century is represented at the lower left hand corner of the dates, as shown at 18, and this group is numbered 1700, to indicate that it represents the eighteenth century. Above the eighteenth century group is a similar group, shown at 19 and numbered 1800, while at the opposite end of the strip 17 and arranged one above another, are groups 20 and 21, marked respectively 1900 and 2000. A space is left between the upper and lower groups of numbers on the strip 17, and in this space occur the letters of the word "Century," and as here used the letters stand for certain years. The letters which indicate leap years are preferably produced in distinctive type, but the letters may be omitted entirely without departing from the principle of my invention.

By reference to Fig. 4, it will be seen that the strip 17 at the point where the numbers occur is divided into a plurality of columns, and the letters are produced in the columns so as to coincide with the numbers, each letter representing a particular year. It has been found that certain days of the week occur on the same days of the month in various years, but such a coincidence occurs in rotation regularly every twenty eight years. Consequently the numbers in each column in the strip 17 represent an arithmetical series, the common difference of which is twenty eight. By this arrangement, the leap years all occur in certain columns, and they may be printed in distinctive type, as above remarked. Beneath the group of figures on the strip 17 are vertical rows of numbers adapted to represent days of the month, the highest of these being thirty one, and each row represents an arithmetical series having 7 for the common difference, this being the number of days in a week. The names of the months on which these dates occur are arranged adjacent to each row of numbers, as shown in the drawings, and it will be found that sometimes several months of the year come in on the same day, as in the cases of January and October, and consequently one row of figures or numbers answers for both months. In another case one row will answer for three months, as in the case of February, March and November, while in others, a separate row must be used for each month. It will be noticed that in the group of figures representing the eighteenth century, a break occurs at 22, which represents the time when the calendar was changed from old to new style, and for this reason a number of dates are dropped. The upper part of the date group of the eighteenth century will represent the time under the old style, and the lower part will represent time under the new style.

The calendar is used in the following way: To set the calendar for the months of January and February, 1892, the shell or cylinder 12 is turned until the month of January comes beneath and opposite the letters of the upper row of letters on the shell. This is because the letter "T" stands for the year 1892, which will be seen by reference to the 1900 group on the drum 14. After the month of February has passed, the calendar is reset by turning the shell until the month on the drum comes beneath or opposite the letter on the lower row of the shell, which letter stands for the year as indicated on the drum. For instance, to set the calendar for August, 1892, the shell is turned until the month of August, or the name of the month, comes beneath the appropriate letter on the shell; that is, if it was for the year 1892, the name August on the drum would be arranged opposite the letter "N" of the lower row of letters, as above described. To give another example, we will suppose that it is desired to find the date on which the Fourth of July, 1776, occurred. By reference to the drum it will be seen that the letter "E" stands for the year 1776, and consequently the letter "E" of the shell is turned over July, and the appropriate dates will appear in the box 13, so that the day of the week on which the name and date occurred may be at once ascertained.

The directions for using the calendar should be printed in some convenient place upon it.

Having thus described my invention, I claim as new and desire to secure by Letters Patent—

1. A calendar, comprising an outer shell or cylinder having slots therein lettered to represent the days of the week and provided with arbitrary signs adjacent to the slots, and a revoluble drum held to turn in the cylinder, the drum having groups of dates thereon representing the years of a century, vertical rows of numbers representing the days of the month and adapted to register with the slots in the shell, and the names of the several months arranged opposite the rows of numbers, substantially as described.

2. A calendar comprising a shell having seven vertical slots therein produced at equidistant points around the shell, the slots being lettered to represent the days of the week, arbitrary signs produced adjacent to the slots, a revoluble drum to turn within the shell, the drum having groups of figures thereon arranged to represent the years of the centuries, and the vertical columns of each group representing numerical series having the common difference of twenty-eight, signs produced in each column of figures, the said signs corresponding with those on the outer shell, and rows of numbers produced on the strip and representing the days of the months, the rows being arranged to register with the slots in the outer shell and the names of the months arranged adjacent to the rows of numbers, all substantially as shown and described.

DANIEL A. HOLTZMAN.

Witnesses:
JOHN L. UHRICH,
MARY S. IMMEL.